United States Patent
Di Federico et al.

(10) Patent No.: US 6,999,621 B2
(45) Date of Patent: Feb. 14, 2006

(54) TEXT DISCRIMINATION METHOD AND RELATED APPARATUS

(75) Inventors: Riccardo Di Federico, Monza (IT); Paola Carrai, Monza (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 695 days.

(21) Appl. No.: 10/153,253

(22) Filed: May 22, 2002

(65) Prior Publication Data

US 2003/0021476 A1    Jan. 30, 2003

(30) Foreign Application Priority Data

May 23, 2001    (EP)    ................................. 01201972

(51) Int. Cl.
G09K 9/00    (2006.01)

(52) U.S. Cl. ........................ 382/176; 382/165; 382/170

(58) Field of Classification Search ................ 382/176, 382/170, 165; 358/462, 464
See application file for complete search history.

(56) References Cited

U.S. PATENT DOCUMENTS

| 4,593,325 | A | * | 6/1986 | Kannapell et al. ......... 358/3.22 |
| 5,048,096 | A | | 9/1991 | Beato |
| 6,185,329 | B1 | | 2/2001 | Zhang et al. ............... 382/176 |
| 6,735,338 | B1 | * | 5/2004 | Conklin ...................... 382/232 |

OTHER PUBLICATIONS

Zhong et al: "Locating text in complex color images" Document Analysis And Recognition, 1995., Proceedings Of The Third International Conference On Montreal, Que., Canada Aug. 14-16, 1995, Los Alamitos, CA, USA, IEEE Comput. SOC, US, Aug. 14, 1995, pp. 146-149.

Herzner et al: "DVS-A System for Recording, Archiving and Retrieval of Digital Video in Security Systems" Hypertext-Information Retrieval-Multimedia 1997 (HIM '97), 'Online! Sep. 29, 1997—Oct. 2, 1997.

* cited by examiner

*Primary Examiner*—Phuoc Tran
(74) *Attorney, Agent, or Firm*—Larry Liberchuk

(57) ABSTRACT

A text discrimination method includes scanning a line of an electronically generated image; estimating the background segment of the scanned image line, and analyzing the difference between an estimated background segment and a non-background segments to determine if the non-background segments form part of a text portion of the image.

15 Claims, 4 Drawing Sheets

TEXT DISCRIMINATION METHOD AND RELATED APPARATUS

The present invention relates to a method of discriminating between text and background within an electronically generated image and including the steps of scanning each line of the image in order to identify text and background segments.

Electronic visual display units find wide use particularly in the information technology field. With, for example, computer-generated images, it can often become necessary to process the image data so as to adapt the image to particular display requirements.

For example, and in particular with LCD devices, which exhibit fixed pixel dimensions, it can become necessary to convert the image format of the incoming RGB signals delivered from a graphic card associated with the display. Such displays generally employ an IC controller serving to adapt the incoming RGB signals so as to achieve the appropriate synchronization, frame-rate conversion, colour/brightness/contrast adjustment and, as mentioned before, image format conversion. When, for example, the graphic card serves to produce an image format different from that supported by the LCD visual display unit, some form of adaptation, generally zooming, must be performed in order to adapt the signal to the particular resolution offered by the LCD. In greater detail, if it is assumed that the LCD has a native resolution of 1024×768 pixels, while a relatively old graphic card, which perhaps only supports standard VGA modes of 800×600 or 640×480 pixels, is provided, it can be appreciated that the image must be zoomed from 640 to 1024 pixels horizontally, and from 480 to 768 pixels vertically. Such zooming is generally achieved by re-sampling and filtering the input signal. This disadvantageously serves to introduce blurring into the image which is particularly noticeable around intended sharp edges such as text.

It is of course appreciated that such blurring can be avoided by the adoption of an image processing arrangement dedicated to the processing of text. The required sharpness of the text images is then retained, but any such special text scaling algorithm will not function appropriately for other image content, e.g. background or photograph portions of the image, and so it can be seen that such an arrangement provides one scenario in which means for accurately discriminating between text and background segments within an image could be advantageously employed. The separated text portions and background image portions could be advantageously processed separately by means of appropriate respective scaling algorithms so that the zoomed image retains all the appropriate sharpness and contrast of the original image.

Also, traditional IC controllers tend to apply the same processing function to the whole image. In this manner, a single filter must then serve to offer a compromise between text/graphics sharpness preservation and non-antialiased smoothness of natural content areas. More recent IC controllers have adopted a differentiated processing step for sharp edges and assumed natural portions by means of a low pass filtering arrangement and such differentiation is usually made on the basis of local contrast evaluation. However, the subsequent processing merely comprises switching between two linear filters and no subsequent processing effort is incurred in seeking to identify text on a pixel by pixel basis.

U.S. Pat. No. 5,048,096 discloses a process for seeking to remove non-text matter from an image so as to assist with, for example, subsequent optical character recognition processing and employing so-called run length analysis in which the pixels forming a single line are reviewed in an attempt to identify those pixels that form part of the text image within each line.

However, such an arrangement is disadvantageously limited with regard to the manner in which it can detect more than one text colour, or process background inversions arising in the horizontal direction of the image. Moreover, the hardware requirement arising in relation to such a known process can prove limiting.

It is an object of the invention to provide an improved text discrimination method and apparatus for use with video signals driving a visual display unit.

According to one aspect of the present invention, there is provided a text discrimination method for an electronically generated image and including the step of scanning a line of the image, characterised by the steps of estimating at least one background segment of the scanned image line, and analysing differences between the at least one estimated background segments and estimated non-background segments to determine if the estimated non-background segments form part of text portions of the image.

The present invention is particularly advantageous in requiring reduced hardware resources such as a single memory line and a limited number of computations whilst also achieving appropriate speed and accuracy of operation. The invention advantageously allows for the detection of text portions of more than one colour even if found in adjacent locations in the same region of the display. Background inversions arising in the horizontal direction of each image line can also be processed in a manner exhibiting an advantage over the prior-art.

Within the processing offered by the present invention, which can advantageously achieved by means of an appropriate algorithm, it is possible to identify not only in which areas or regions of the image text as present but, more importantly, which pixels of the image form part of a segment of text. It is then advantageously possible to scale the text image in a particularly powerful way since, with the actual position of the text-pixels having been determined, an improved pixel repetition procedure can be applied which, unlike known traditional linear filtering, will not introduce grey levels into the processed image such that the original contrast and sharpness is preserved in an advantageous manner.

It will of course be appreciated that the present invention can be employed in a variety of situations where it can prove advantageous to process the text portions of an image separately from background portions and, in particular, where some form of zooming operation is required in order to preserve the sharpness and contrast of the text image.

Background segments are estimated on a line-by-line basis and stored in storage means which is updated when the background segment of a subsequent line is estimated. The storage means is updated with the background estimation of a current line input. Further, previous valid background estimation segments are retained in memory locations and not updated with current background line estimation values. These features prove particularly advantageous in retaining the accuracy of the method whilst retaining the hardware requirement of merely a single memory line.

The estimating of the at least one the background segment is based on a determination of width and an uniformity of a segment of a line of the image. This feature proves advantageous in offering a particular accurate, yet simple, manner of confirming which segments of the image line determined to be non-background segments, can again accurately be determined to comprise text segments.

The uniformity is derived from comparing a derivative of each segment with a threshold value. This serves to offer a particularly advantageous and simple means for achieving background discrimination. A histogram parameterization of each background estimation line segment may be used which is particularly advantageous when analyzing images having high contrast background regions such as those produced with photographs or graphics images.

It should therefore be appreciated that the present invention can provide for a method, which can be embodied within an algorithm, and can be arranged to detect, at pixel level, text found within, for example, computer-generated images. Such detection is performed by an analysis of the contrast difference between the perceived text segment and an estimated background segment and in which the background estimation procedure, which is carried out on a line-by-line basis, is based on updating a background estimation line buffer with those part of a current input line which are determined to be uniform and long enough to represent background. The text can then advantageously be processed in a manner different from other image regions such as with monitor scalers, the optical character recognition of computer-generated text images or the zooming feature of image editing programs, etc.

These and other aspects of the invention will be apparent from and elucidated with reference to the embodiments described hereinafter.

The invention is described further hereinafter, by way of example only, with reference to the accompanying drawings in which.

Figure 1:
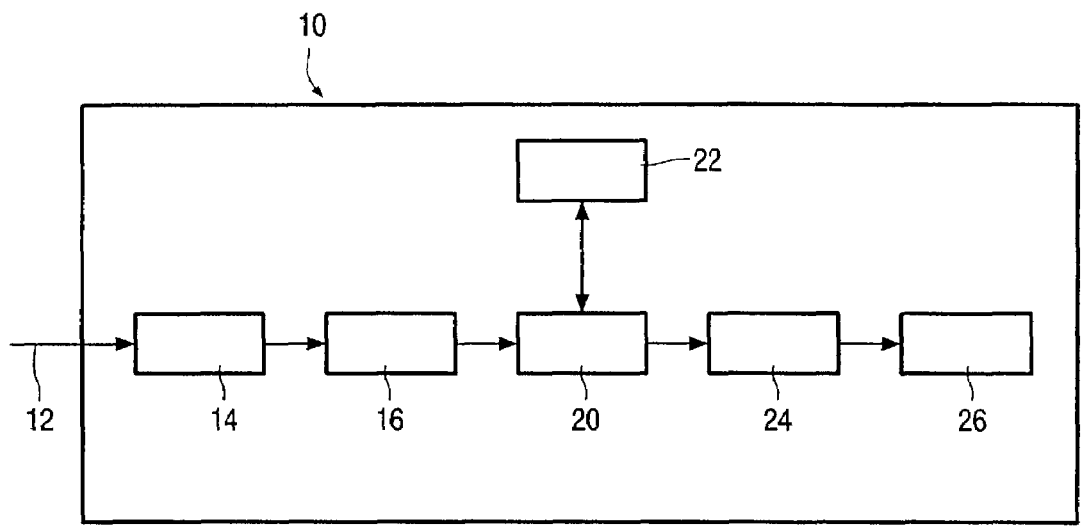
FIG. 1 is a block diagram of an IC controller processing chain in which the present invention can be employed.

Turning first to FIG. 1, there is illustrated a block diagram of an IC controller processing chain 10 which is arranged to receive, for example, an YUV or RGB input video signal 12 at an image captured device 14 and which subsequently delivers the signal to a YUV to RGB converter 16. The signal output from the RGB converter 16 is delivered to a frame rate conversion unit 20 which interfaces with a frame memory 22. From the frame rate conversion unit 20, the signal is then delivered to a scaling engine 24 which, in the illustrated embodiment, includes a text detector arranged to operate in accordance with the present invention as will be described later in relation to FIG. 2. The output of this scaling engine is delivered to a Gamma correction unit 26 providing for overall brightness/contrast control.

As mentioned, the methodology of the present invention is, in the illustrated example, embodied within an algorithm the functional location of which is within the scaling unit 24 of the IC controller 10. Thus the scaling unit 24 serves to provide for image format conversion.

The RGB input signal 12 is delivered to the IC controller 10 in a line-by-line manner such that each line is processed in turn by the processing chain 14–26 illustrated in FIG. 1. This chain forms a processing pipeline in which each section serves to influence, or adapt, a particular characteristic of the image, such as colour conversion, de-interlacing, frame rate conversion, image format conversion and camera correction etc. As mentioned before, the format conversion is advantageously achieved by the scaling engine 24 and can, in the illustrated embodiment, be considered a two-step process in which text segments of the image are separated from non-text segments and the two separated portions are then processed by respective scaling algorithms to achieve the required processing of the overall image.

Figure 2:
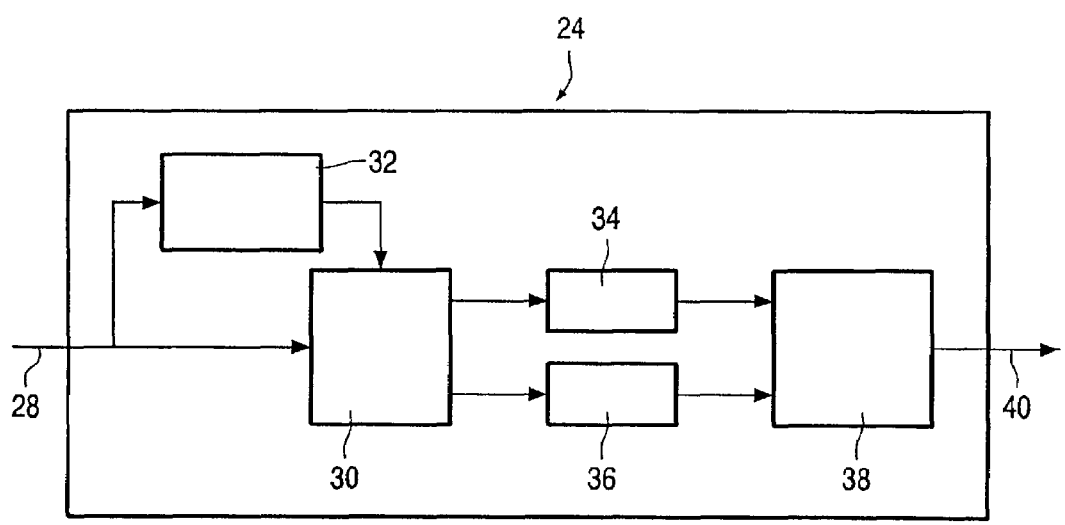
FIG. 2 is a block diagram of the scaling engine of FIG. 1 and in which a text detector embodying the present invention is employed.

Such processing is illustrated further by reference to FIG. 2 in which the scaling engine 24 of FIG. 1 is shown in greater detail. The scaling unit 24 is arranged to receive input signal 28 from the frame rate conversion unit 20 of FIG. 1, which signal is then delivered both to a signal splitting unit 30 and to a text detector unit 32 which provides the functional location of the algorithm embodying the present invention. In view of its manner of operation, the text detector unit 32 is here referred to as a background estimation line text detector 32 which also serves to drive the signal splitting unit 30. For clarification, the input to the background estimation line text detector 32 comprises image lines delivered from the frame rate conversion unit 20 and the output of the background estimation line text detector 32 comprises a binary signal representing a text/non-text decision for each pixel of that line. The input of the background estimation line text detector 32 can comprise a line buffer from which the data is read, and the output can be formed by a binary buffer (not shown) of the same length. It will however of course be appreciated that the processing offered by the present invention can be implemented so that the output is either a line buffer in which the binary value of each element indicates the text-non-text decision of each corresponding pixel, or indeed a bit stream which can prove particularly advantageous should it be necessary to introduce a constant delay of a predetermined number of pixels. Indeed, a background segment can be recognised, and copied into the background estimation line buffer, after a minimum predetermined number of pixels from the last derivative threshold switching and the background segment is then continued pixel by pixel, until the next derivative threshold switching is achieved as will be described further below. If, however, a buffer is introduced into the processing pipeline of FIG. 1, which proves to have a greater length than the predetermined minimum number of pixels, such operation can be achieved as and when required thereby allowing for a delayed decision on a pixel-by-pixel basis. However, in the illustrated example, the whole detection line is calculated as output.

As will be described further below in relation to the particular algorithm embodying the present invention, a key feature of the present invention relates to the continual updating, on a line-by-line basis, of estimated background segments. For each line of the original image, those parts that are sufficiently uniform and wide are identified as estimated background and copied to the relevant position within the background estimation line buffer. The final image can then be formed by combining of the estimated background lines so as to provide for a complete, but text-less image. For each line of the image, the luminance of the original image is compared to the luminance of the background estimation line in the corresponding position and if the luminance difference exceeds a predetermine threshold for each pixel, that particular pixel is then flagged as a text pixel.

As illustrated in the block diagrams of FIGS. 1 and 2, the algorithm embodying the present invention finds particular application within the processing pipeline of a IC controller 10 and the input image signal is split between two separate signal parts based upon the output of the background estimation line algorithm operating within the background estimation line text detector 32. With specific reference to FIG. 2, the then separated text and background data is processed by means of different respective algorithms in the respective scaling units 34 (text), 36 (background) and such scaled signals are then combined in the combining unit 38 to provide for an output signal 40 which is delivered to the gamma correction unit 26 of FIG. 1. Since the separated text and background signals have been scaled by appropriate respective algorithms within the scaling units 34, 36, the combined signal 40 can produce an scaled image which, with regard to contrast and sharpness, remains true to the original image.

It should however be appreciated that the estimated background is employed merely for detecting text and does not provide an input for the scaling engine. Rather, the actual background can be extracted by complementing the detected text and then extrapolating the missing pixels from the neighbouring pixels.

Figures 3A, 3B:
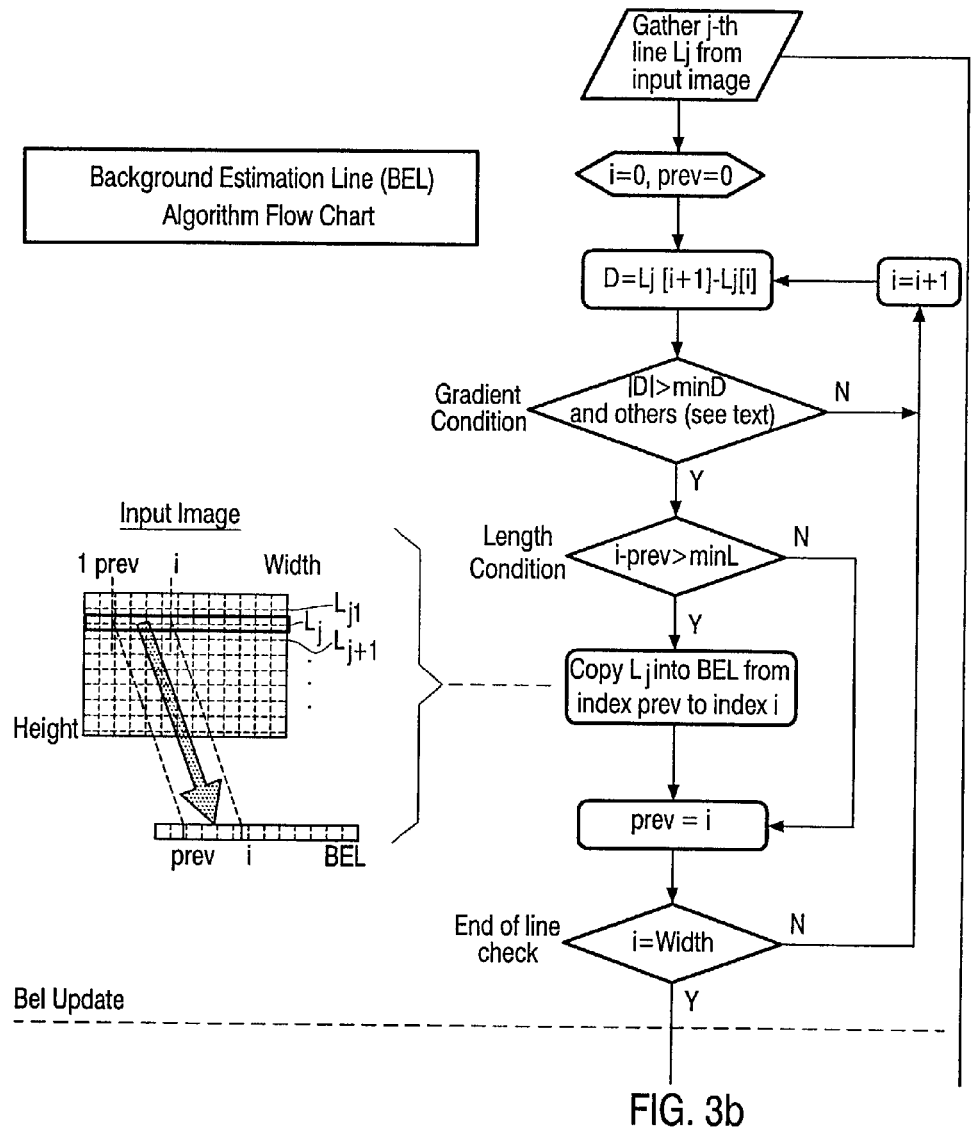
FIG. 3 is a flow diagram illustrating the processing employed within such a text detector has illustrated in FIG. 2.
Figure 3B:
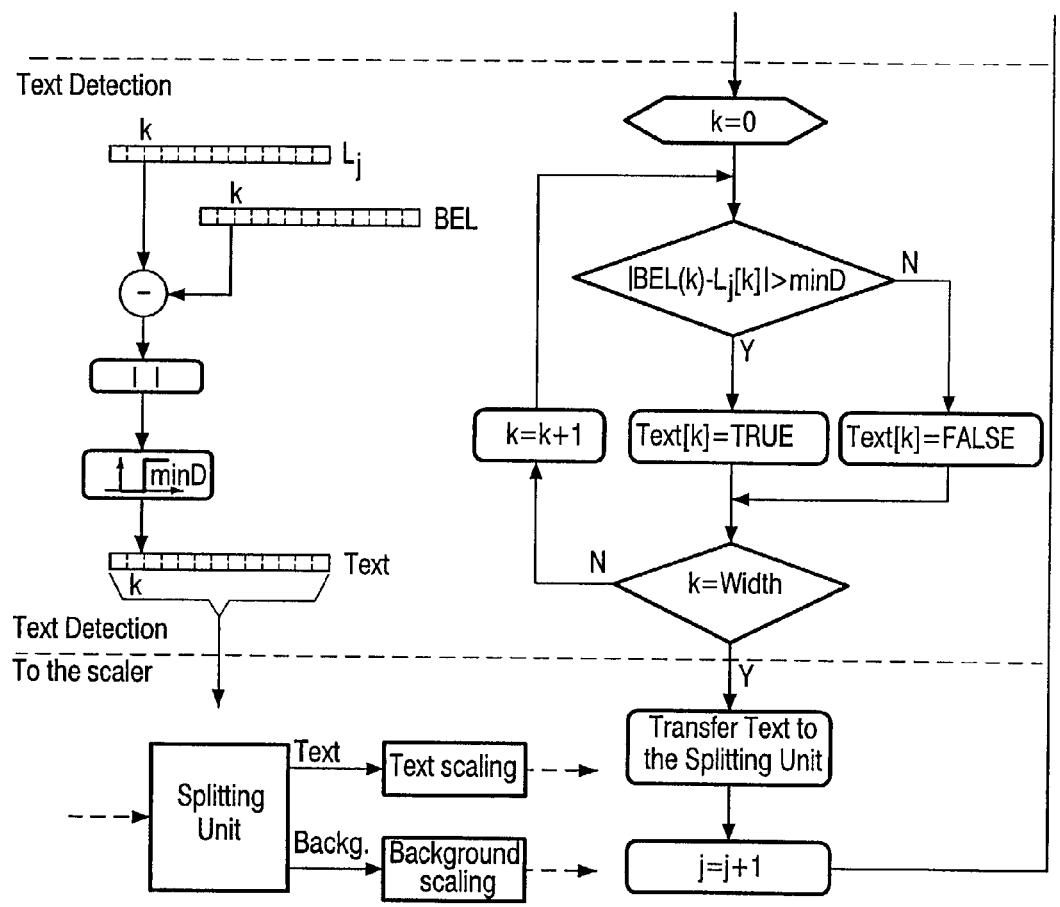

Turning now to FIG. 3, there is illustrated a flow diagram serving to illustrate the manner in which an algorithm embodying the present invention can achieve the required background evaluation of the subsequent background estimation line updating, and subsequent text detection.

The algorithm is based on scan line analysis employing a one line state register. The illustrated embodiment starts from the premise that text is in general surrounded by background, which is either uniform (one colour) or graphic/photographic in nature. If we scan the image on a line by line basis we can estimate and update the background regions within a line. The text is then estimated by analysing contrast differences with respect to the estimated background. Since text has a horizontal direction, it is generally always true that a background line will precede a text line. On this basis, it is likely that when analysing text the current background estimation holds the correct value. The procedure for background estimation works as follows and relates to the Matlab code representation of an embodiment of the algorithm outlined below.

First, the Background Estimation Line (BEL), which serves as the state register of the algorithm, is initialized with a conventional value (−1), indicating that no background has been detected, that is:

$$bel = -1 * ones\ (1, w)$$

Where w is the image width and the function "ones ( )" creates a line vector containing ones.

Secondly, for each line of the image, a selection of those segments that can be classified as background is performed. As mentioned previously, each segment must be sufficiently wide and uniform and exhibit low luminance variations. These conditions are implemented by respectively setting a threshold on the length of the estimated segments (minL), and a threshold on the maximum derivative of each segment (maxD). When a segment longer than minL is enclosed by two derivative peaks taller than maxD as an absolute value, it is copied onto the BEL, thereby updating the previous estimate. The remainder of the BEL will hold the previous value, thereby propagating the last valid estimation.

In setting the threshold maxD, it should be appreciated that a value that proves to be too high could include into the background segments some low contrast text, while a value that proves to be too low could lead to failure by recognizing photographs as text.

In some cases, for instance with anti-aliased text, two consecutive luminance increments or decrements, for example, background to light gray and light gray to dark gray and vice versa might be identified. However, even though these difference are higher than maxD they should not be interpreted as the beginning of a background segment. A further condition can therefore be imposed to avoid such inclusions. That is, those segments that meet the condition are copied into the corresponding positions inside the BEL, while for the other parts of the background the previous valid estimate will hold.

For those segments that have not been classified as background, a comparison with the previous estimate of the background is performed. The pixels that are then determined to exhibit sufficient contrast with respect to the estimated background are then identified as text.

To illustrate the example further, there is now outlined a Matlab code representation of an algorithm embodying the present invention.

```
// minimum background segment length
minL=35;
// minimum derivative for background switching
maxD=60;
//D is the horizontal difference vector of the input luminance, padded with a zero to make the
//dimension of the difference vector consistent with that of the luminance
D=([diff(lum(i,:)) 0]);
//The following operation fills the vector fD with the indexes of those pixels of the luminance
//vector
//that meet the conditions on the derivative to be considered the start or end of a background
//segment.
// These include:
// -      The absolute value of the derivative associated with the pixel must be higher
//than maxD:
//           abs(D)>maxD
// -      consecutive high value of derivative, when they have the same sign, are
//considered part of the background.
//         In some cases, for instance with anti-aliased text, two consecutive and
//similar luminance increments
// or decrements (background to light gray and light gray to dark gray and vice versa)
//could be found.
// Even though these differences are higher than maxD they should not be interpreted as
//the beginning of
// a background segment. We therefore consider as valid start/end of a background
```

-continued

```
//segment a derivative which,
    // besides being high enough, has alternate sign compared to the previous or the
//following one:
    //          .... D./[[D(2:w) D(w)]+0.0001]<0 ... and ... D./[[D(1)
//D(1:w-1)]+0.0001]<0 ...
    // or
    // it is much higher than the previous or the following
    //          .... D./[[D(2:w) D(w)]+0.0001]>th_step ...
    // (all divisions are element by element vector divisions and the 0.0001 is to avoid
//divisions by zero)
//
// - the vector fD is padded with 1 (before) and w (after) intending that the beginning and
//end of the line
// must be considered as segment extremes
//              [1 find(ab .....     ... <0)) w];
fD=[1 find(abs(D)>maxD & (D./[[D(2:w) D(w)]+0.0001]>th_step | D./[[D(2:w)
  D(w)]+0.0001]<0) & (D./[[D(1) D(1:w-1)]+0.0001]>th_step |D./[[D(1)
  D(1:w-1)]+0.0001]<0)) w];
// The following operation computes the distance (in pixels) between a derivative peak and
//the following
// (remember that fD is the vector containing the indexes of the derivative peaks).
DfD=diff(fD);
// Now we can select the segments that are long enough to be considered as background
//segments. fDfD
// represents the indexes within DfD of the segments longer than minL.
fDfD=find(DfD>minL);
```

Figure 4A:
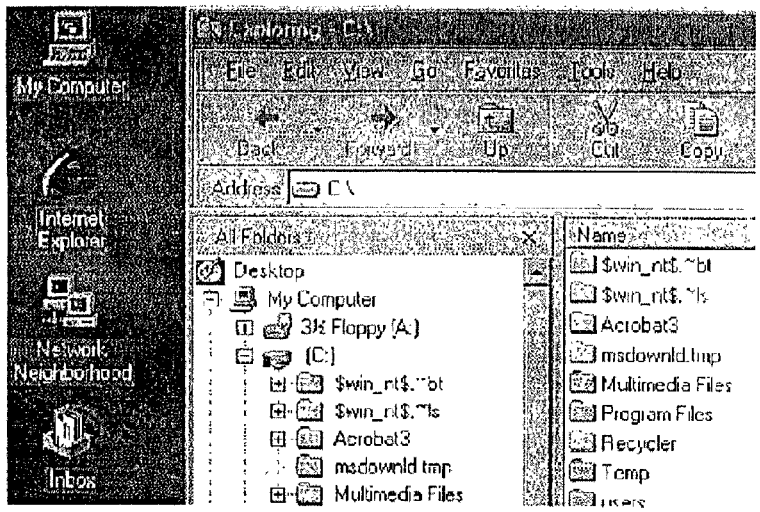
FIGS. 4A, 4B and 4C illustrate the difference between an original VDU image, an estimated-background VDU image in which the text has been detected and removed, and a detection output image comprising the detected text in accordance with an embodiment of the present invention.
Figure 4B:
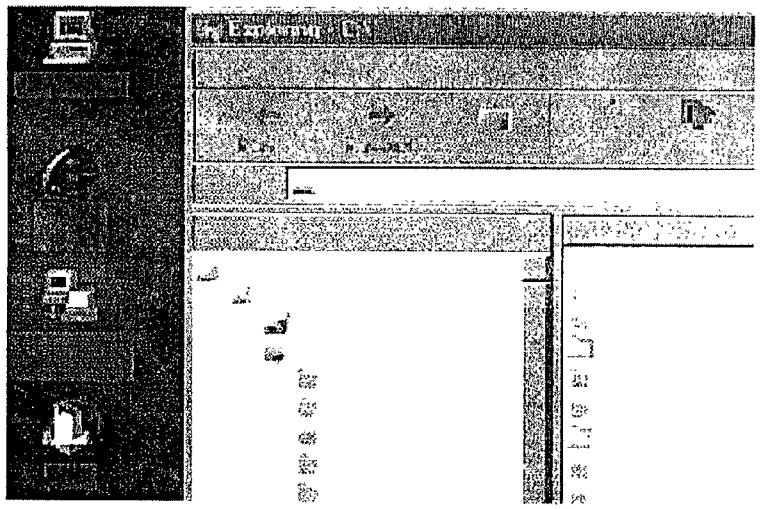
Figure 4C:
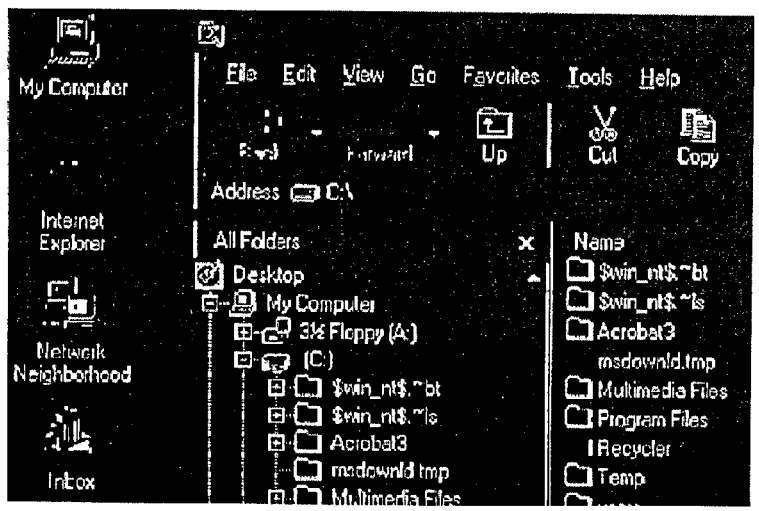

Turning now to FIG. 4A there is illustrated an example of an original image as might be expected on a computer screen in accordance with this normal display, and FIG. 4B is an illustration of the same display once the signal from the graphics card has been processed in accordance with the present invention so as to discriminate between text and non-text portions. The display here representing an illustration with the text portions removed. The text portions themselves are found in a detection output image signal which is illustrated in FIG. 4C.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A text discrimination method for an image the method including:
   scanning a line of the image,
   estimating at least one background segment of the image line,
   analyzing a difference between the at least one background segment and non-background segments to determine if the non-background segments form part of a text portion of the image, and
   processing the at least one background segment separately from at least one of the non-background segments to form a processed background segment and a processed non-background segment.

2. A method as claimed in claim 1, further including storing the estimated background segment within storage means arranged to be updated when the background segment of a subsequent line is estimated.

3. A method as claimed in claim 2, wherein background segments are estimated on a line-by-line basis and the storage means is updated with the background estimation of a current line input.

4. A method as claimed in claim 3, further including retaining previous valid background estimation segments in memory locations not updated with current background line estimation values.

5. A method as claimed in claim 1, wherein the estimating the at least one the background segment is based on a determination of width and a uniformity of a segment of a line of the image.

6. A method as claimed in claim 5, wherein the uniformity is derived from comparing a derivative of each segment with a threshold value.

7. A method as claimed in claim 1, wherein the analyzing the difference between an estimated background segment and a non-background segment comprises analyzing a contrast of the non-background segment with respect to the estimated background segment.

8. A method as claimed in claim 1, wherein a text-identifying signal is output by means of a binary buffer.

9. A method as claimed in claim 1, wherein a text-identifying signal is output by means of a bit stream.

10. The method of claim 1, further comprising combining said processed background segment with said processed non-background segment to form a scaled version of said image.

11. A text discrimination method for an image the method comprising:
   scanning a line of the image;
   estimating at least one background segment of the image line;

analyzing a difference between the at least one background segment and non-background segments to determine if the non-background segments form part of a text portion of the image; and adopting a histogram parameterization of each background estimation line segment.

12. A text discrimination method for an image the method comprising:

scanning a line of the image;

estimating at least one background segment of the image line;

analyzing a difference between the at least one background segment and non-background segments to determine if the non-background segments form part of a text portion of the image;

determining on a line-by line basis for pixels on a line an difference value of a luminance value of the pixel and a luminance value of an adjacent pixel; and classifying a sequence of subsequent pixels on the line as background segment if:

the pixels in the sequence have a difference value less than a maximum difference value; and a number of pixels in the sequence is larger than a minimum length, else classifying the pixels as potential text.

13. A method as claimed in claim 12, further comprising:

comparing the luminance value of the pixel classified as potential text with a luminance value of a corresponding pixel in a previous line in a background segment; and classifying a pixel as text if the absolute difference value between the two luminance values exceeds the maximum difference value.

14. Apparatus for discriminating between text and background within an image, said apparatus comprising:

means for scanning a line of the image;

means for estimating at least one background segment of the image line;

means for analyzing a difference between the at least one background segment and non-background segments to determine if the non-background segments form part of a text portion of the image, and means for processing the at least one background segment separately from at least one of the non-background segments to form a processed background segment and a processed non-background segment.

15. The apparatus of claim 14, further comprising means for combining said processed background segment with said processed non-background segment to form a scaled version of said image.

* * * * *